(12) United States Patent
Marsh et al.

(10) Patent No.: US 7,672,817 B2
(45) Date of Patent: Mar. 2, 2010

(54) FLIGHT IN FACTORY

(75) Inventors: Bob Marsh, Lake Stevens, WA (US); Kinson VanScotter, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/557,857

(22) Filed: Nov. 8, 2006

(65) Prior Publication Data

US 2008/0271523 A1    Nov. 6, 2008

(51) Int. Cl.
*G06F 17/50*    (2006.01)
*G01M 7/00*    (2006.01)

(52) U.S. Cl. .................. 703/2; 703/7; 73/663
(58) Field of Classification Search .............. 703/2, 703/6–8; 73/663; 244/72
See application file for complete search history.

(56) References Cited

U.S. PATENT DOCUMENTS

| | | | |
|---|---|---|---|
| 2,151,584 A | 3/1939 | Bugatti | |
| 2,319,675 A | 5/1943 | Grinter | |
| 2,340,505 A | 2/1944 | Beed | |
| 3,911,733 A | 10/1975 | Bhuta et al. | |
| 4,453,413 A | 6/1984 | Schneider | |
| 5,065,630 A | 11/1991 | Hadcock et al. | |
| 6,125,333 A | 9/2000 | Pun | |
| 6,619,127 B2* | 9/2003 | Miller et al. | 73/663 |
| 6,745,101 B2 | 6/2004 | Andersen et al. | |
| 6,826,299 B2 | 11/2004 | Brown et al. | |
| 6,980,881 B2 | 12/2005 | Greenwood et al. | |
| 7,219,855 B2* | 5/2007 | Hamamoto et al. | 244/72 |
| 2002/0164560 A1* | 11/2002 | Borta | 434/55 |
| 2003/0126929 A1* | 7/2003 | Miller et al. | 73/663 |
| 2006/0136102 A1 | 6/2006 | Burner et al. | |

FOREIGN PATENT DOCUMENTS

| | | |
|---|---|---|
| WO | WO 01/27606 | 4/2001 |
| WO | WO 02/18958 | 3/2002 |

* cited by examiner

*Primary Examiner*—Thai Phan
(74) *Attorney, Agent, or Firm*—Rozenblat IP LLC

(57) ABSTRACT

The invention relates to methods of measuring an aircraft under simulated flight-loads while the aircraft is not in-flight. While the aircraft is under the simulated flight-loads, positions of one or more portions of the aircraft may be measured in order to determine how the aircraft is performing under such loads. The aircraft may be readjusted and/or redesigned based on the measurements in order to reduce drag on the aircraft.

19 Claims, 4 Drawing Sheets

FLIGHT IN FACTORY

BACKGROUND OF THE INVENTION

It is important to determine how an aircraft will perform in flight conditions in order to determine whether drag on the aircraft can be reduced. Many prior art methods measure expected aircraft in-flight performance, such as the deflections of the wings, by testing the aircraft while in flight. The prior art methods may experience one or more problems such as difficulty in measuring the aircraft while in the air, prolonged time to conduct testing of the aircraft during flight, and difficulties experienced during flight, amongst other types of problems.

A method of measuring an aircraft under simulated flight-loads, while the aircraft is not in flight, is needed which may solve or reduce one or more problems associated with one or more of the prior art in-flight measuring methods.

SUMMARY OF THE INVENTION

In one aspect of the invention, a method of measuring an aircraft under simulated flight-loads while not in flight is provided. In one step, simulated flight-loads are applied to the aircraft while the aircraft is not in flight in order to substantially simulate loads on the aircraft during flight. In another step, a position of one or more portions of the aircraft is measured while under the simulated flight-loads.

In another aspect of the invention, another method of measuring an aircraft under simulated flight-loads while not in flight is provided. In one step, expected flight-loads on the aircraft are determined in order to approximate loads the aircraft experiences while in flight. In another step, the expected flight-loads are applied to the aircraft while the aircraft is not in flight in order to simulate flight. In still another step, the aircraft is measured while under the expected flight-loads.

In a further aspect of the invention, an aircraft is provided. When the aircraft was not in flight simulated flight-loads were applied to the aircraft to substantially simulate loads on the aircraft during flight. The aircraft was measured while under the simulated flight-loads.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
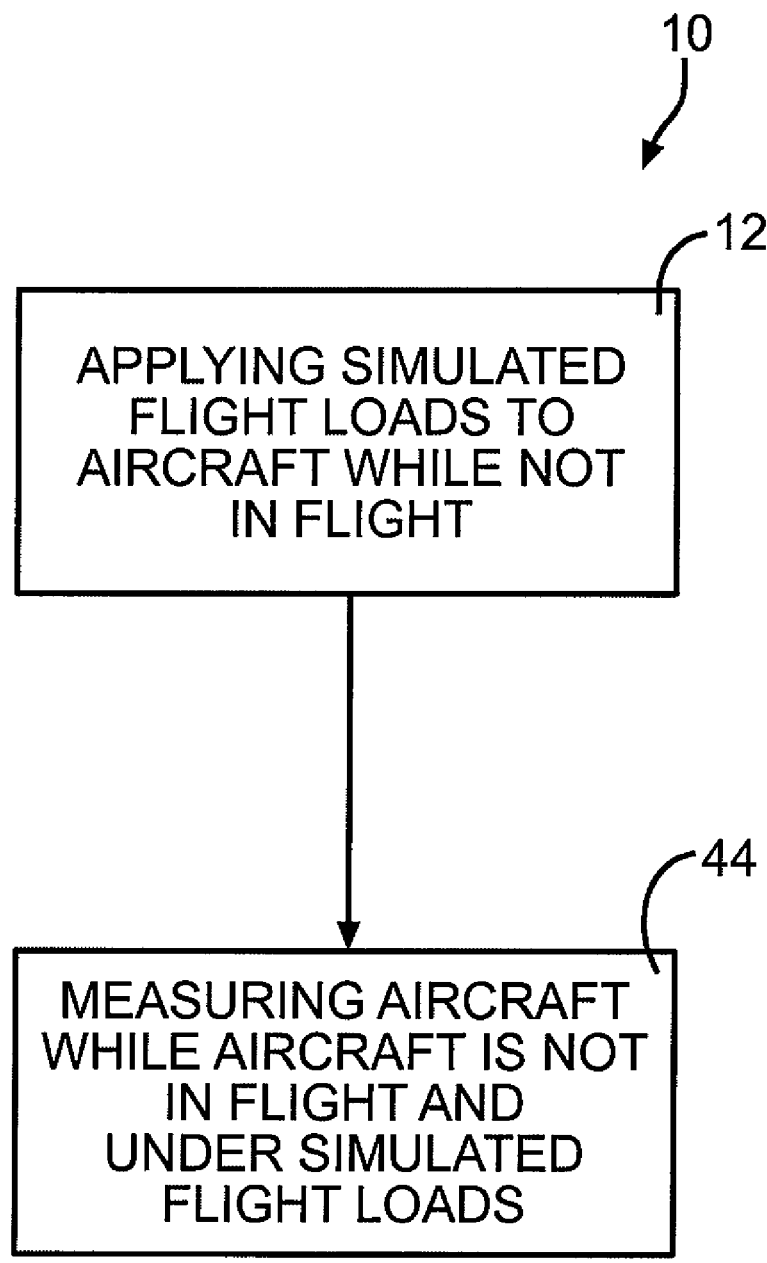
FIG. 1 depicts a flowchart showing a method of measuring an aircraft under one embodiment of the invention.

As shown in FIG. 1, in one embodiment of the invention, a method 10 of measuring an aircraft, while the aircraft is not in flight and under simulated flight-loads, is provided. In one step 12, simulated flight-loads may be applied to the aircraft while the aircraft is not in flight. The simulated flight-loads may substantially simulate loads on the aircraft during flight, and may be in the amount of 1 g or in other amounts. The simulated flight-loads may have been determined, or may be determined, by flying a second aircraft having pressure sensors which detected and/or recorded actual flight-loads. The pressure sensors may have been located on the wings of the aircraft and/or on other parts of the aircraft in order to determine the pressure amounts over various portions of the aircraft at various times. This flight-load data may have been sent to one or more computers which stored the flight-load data for various portions of the aircraft. The determined flight-load data of the second aircraft, which may be referred to as the expected flight-loads of the aircraft being tested, may then be used in order to apply substantially the same simulated flight-loads to the aircraft being tested. For instance, the same pressure loading distribution which occurred to the second aircraft during flight may be applied in the same distribution and time interval over the aircraft being tested. In such manner, the aircraft may be tested with real-life flight-loads.

In another embodiment, the simulated flight-loads applied to the aircraft being tested may comprise loads determined by a computer model, which may also be referred to as the expected flight-loads of the aircraft. For instance, a computer may be used to determine expected flight-loads on the aircraft being tested. The computer determined expected flight-loads may then be applied as simulated flight-loads to the aircraft being tested in order to test the aircraft under the expected loading conditions. It should be noted that the expected flight-loads of the aircraft being tested may comprise the expected flight-loads of the aircraft during flight, and as discussed, may be determined through actual flight measurements of another aircraft, or may be determined through a computer model to predict the aircraft's flight-loads. In one embodiment, the simulated flight-loads applied to the aircraft may comprise the determined expected flight-loads of the aircraft.

Figure 2:
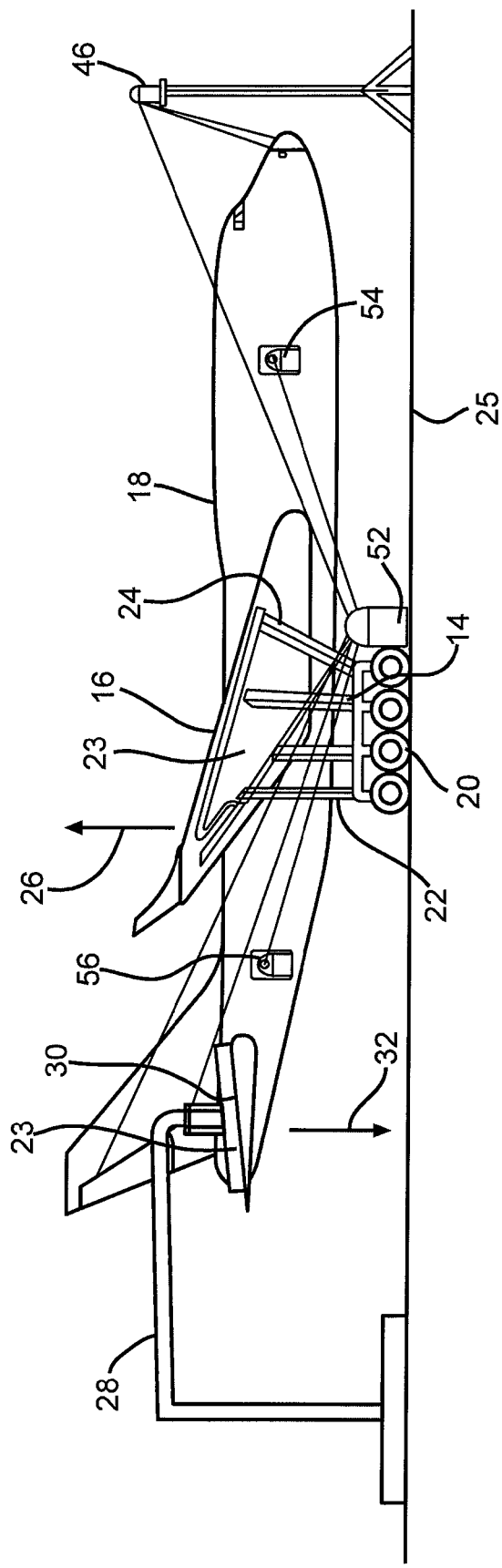
FIG. 2 depicts a side view of an aircraft being supported by cradle devices under one embodiment of the invention.

As shown in FIG. 2, in order to apply the simulated flight-loads to the aircraft, one or more cradle devices 14 may be utilized. While the aircraft 18 is supported on its own landing gear, on a ground surface in a factory or hangar, with simulated passenger, crew, and cargo weight, one or more cradle devices 14 may be placed under each wing 16 of the aircraft 18 in a variety of configurations, positions, and locations. In one embodiment, each wing 16 of the aircraft 18 may have four zones of cradle devices 14 distributed over the wings 16. Each cradle device 14 may comprise wheels 20, jack 22, support members 24, and support surface 23. The wheels 20 may be utilized to move the cradle devices 14 into place under the aircraft wings 16. The support surface 23 supported by the support members 24 may be placed underneath the wings 16 of the aircraft 18. The jacks 22 may be utilized to increase the height of the support surface 23 to force the wings 16 in upwardly directions 26. In such manner, the aircraft 18 may be raised off the ground so that the aircraft 18 may be fully supported by the cradle devices 14 which are located on ground surface 25. The jacks 22 may be motor driven ball-screw jacks, or of other types. Each jack 22 may be equipped with position and force feedback devices. Movement of each jack 22 may be controlled by a computerized control system to enable application of loads necessary to simulate flying conditions, such as transient take off loads. While supported by the cradle devices 14, the weight of the aircraft 18 may include passengers, crew, and cargo, similar to maximum design landing weight. In other embodiments, the weight of the aircraft 18 may be in varying amounts.

Additionally, at the same time the one or more cradle devices 14 are placed against the wings 16 of the aircraft 18, one or more other cradle devices 28 may be placed against the horizontal stabilizers 30 of the aircraft 18 in a variety of configurations, positions, and locations. In one embodiment, one cradle device 28 is applied against each of the left and right horizontal stabilizers 30. The cradle devices 28 may force the horizontal stabilizers 30 in a downward direction 32, while the cradle devices 14 may force the wings 16 in an upward direction 26, in order to substantially simulate loads on the aircraft 18 during flight. The downward force applied to the horizontal stabilizers 30 by the cradle devices 28 may act as a counterbalance to offset the upward force applied to the wings 16 by the cradle devices 14.

Figure 3:
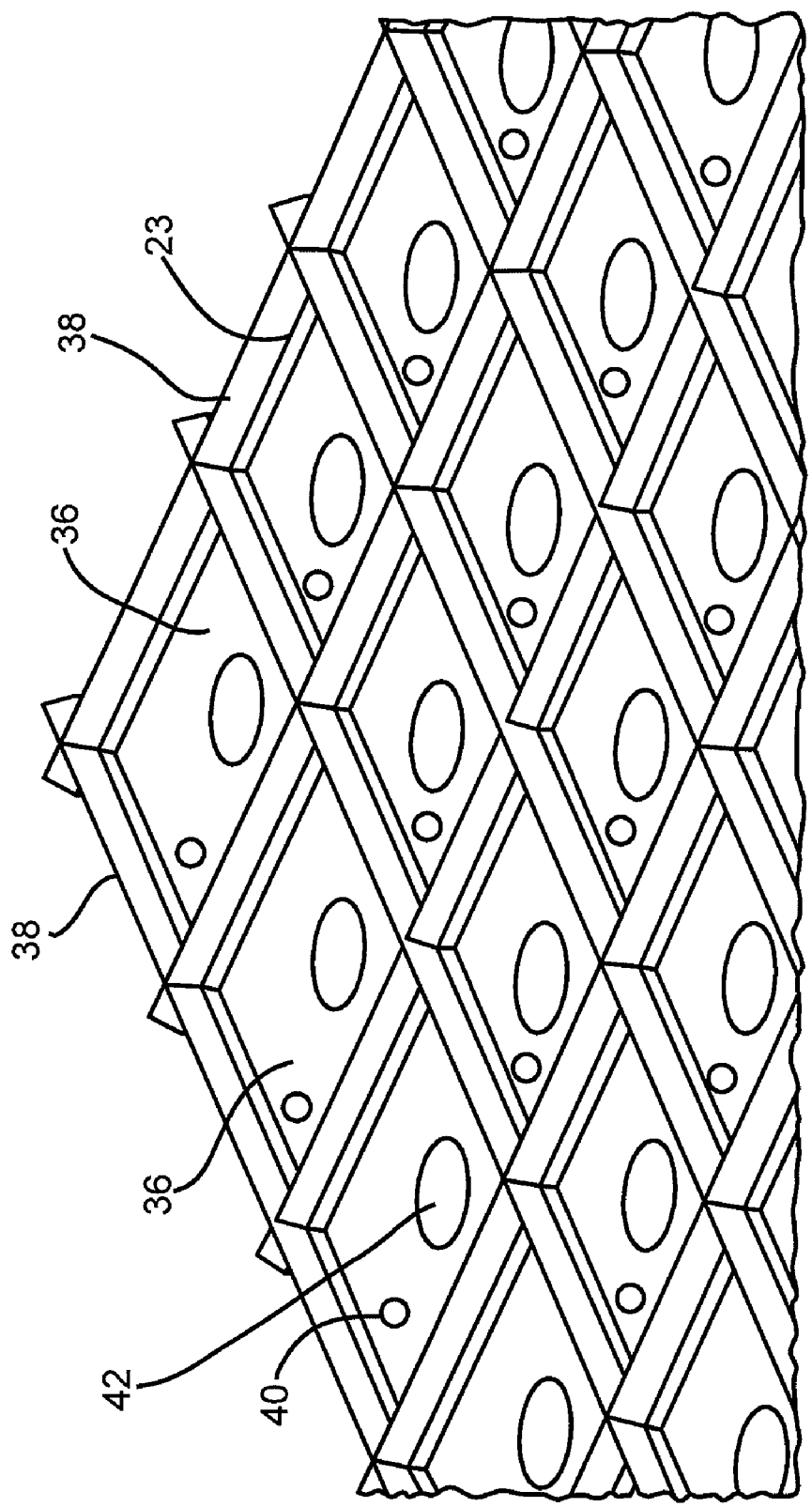
FIG. 3 depicts a partial perspective view of a surface of one cradle device under another embodiment of the invention.

Support surfaces 23 of the cradle devices 14 and 28 may comprise air chambers 36 as shown in FIGS. 2 and 3. As shown in FIG. 3, ribbed surfaces 38 may surround the air chambers 36 which may contain pressure sensors 40 and air holes 42. Support surfaces 23 may abut against the aircraft 18 when the cradle devices 14 and 28 are put into place. The wings 16 of the aircraft 18 may rest against the ribbed surfaces 38 of the cradle devices 14, which may be made of Teflon, Rubber, or other materials. Air pressure may be forced through the air holes 42 of the cradle devices 14 into the air chambers 36, in order to form a thin cushion air wall forcing and supporting the wings 16 of the aircraft 18 upwardly, thereby lifting the aircraft 18 off the ground. The air pressure distribution over the wings 16 of the aircraft 18 may be adjusted in each cradle device zone in order to apply simulated flight-loads on the aircraft 18. The pressure sensors 40 may measure the applied pressure within the air chambers in order to regulate pressure distribution over the aircraft 18. Pressure in the amount of three pounds per square inch may be applied. In other embodiments, varying amounts of pressure may be applied. For instance, in another embodiment, pressure may be applied in the range of one to ten pounds per square inch. In still other embodiments, varying ranges of pressure may be applied. The air chambers 36 of the cradle devices 28 disposed against the horizontal stabilizers 30 may function in the same manner in order to force the horizontal stabilizers 30 in a downward direction utilizing air pressure. In such manner, simulated flight-loads may be applied to the aircraft 18 utilizing the cradle devices 14 and 28.

The cradle devices 14 and 28 may be connected to one or more computers. The computers may control the movements, positions, and loads applied to the aircraft 18 by the cradle devices 14 and 28. As a result, precise, simulated loads may be applied in the appropriate locations, times, durations, and amounts over the aircraft 18 in order to substantially simulate flight-loads on the aircraft 18 without the aircraft 18 being in flight.

Figure 4:
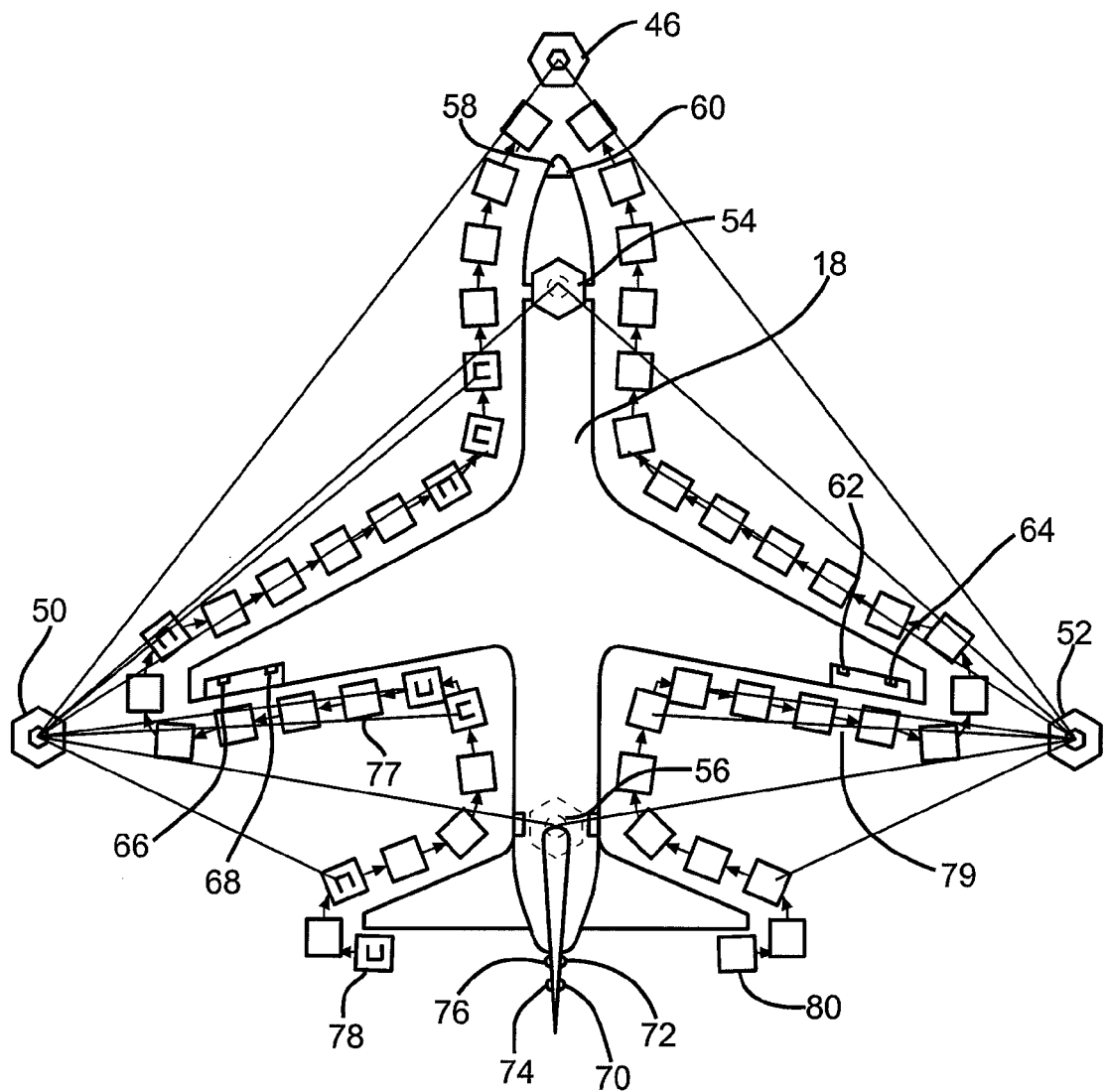
FIG. 4 depicts a top view of an aircraft being measured under yet another embodiment of the invention.

As shown in FIG. 1, in another step 44 of the method 10, a position of one or more portions of the aircraft 18, such as the deflections of various portions of the aircraft 18 such as the wings 16, may be measured while the aircraft 18 is not in flight and under the simulated flight-loads, which may comprise the expected flight-loads of the aircraft 18. During this step, as shown in FIGS. 2 and 4, a laser tracking device 46 may be placed in front of the nose of the aircraft 18, laser tracking devices 50 and 52 may be placed to the left and right of the aircraft 18, and laser tracking devices 54 and 56 may be placed inside open doors of the aircraft 18. The laser tracking devices (i.e. laser trackers) may be networked together, and may be controlled by computers and/or software, such as New River Kinematics Spatial Analyzer software.

Two targets 58 and 60 may be attached to the nose of the aircraft 18. Two targets 62 and 64 may be attached to the outboard aileron of the right wing of the aircraft 18, while two other targets 66 and 68 may be attached to the outboard aileron of the left wing of the aircraft 18. Similarly, two targets 70 and 72 may be attached to the right hand side rudder hinge line of the aircraft 18, while two other targets 74 and 76 may be attached to the left hand side rudder hinge line of the aircraft 18. Each of targets 58, 60, 62, 64, 66, 68, 70, 72, 74, and 76 may comprise combination laser and photogrammetry targets as described in U.S. patent application Ser. No. 11/437,201, titled Combination Laser And Photogrammetry Target, filed on May 19, 2006, which is hereby incorporated by reference. Each of the targets may comprise a first portion adapted to reflect a laser beam towards a laser tracker, and a second portion adapted to reflect a light beam towards a photogrammetry camera.

A central controller (not shown) may initiate the application of simulated flight-loads to the aircraft 18 by causing the cradle devices 14 and 28 to lift the aircraft 18 off the ground, thereby simulating flight. At this point, the laser tracking devices 46, 50, 52, 54, and 56 may acquire the positions of the targets 58, 60, 62, 64, 66, 68, 70, 72, 74, and 76 by reflecting a laser beam off the targets to determine their X, Y, and Z spatial coordinates relative to the tracking devices.

As shown in FIG. 4, two mobile measurement systems 78 and 80 may be placed on each side of the rear of the aircraft 18. Each mobile measurement system 78 and 80 may comprise two photogrammetry cameras, one pro-spot projector, one automated guided vehicle, one automated robot, and twelve targets. The automated guided vehicles may be connected to one or more computers which may guide the vehicles in pre-determined patterns 77 and 79 around the sides of the aircraft 18. The automated robots may comprise motorized scissor lifts having robotic arms, each holding two photogrammetry cameras and a pro-spot projector. In other embodiments, other equipment may be added to the automated scanning robots such as conventional or still cameras, laser scanners, ultrasonic scanners, X-ray devices, and other types of apparatus. At all times, at least one side of each mobile measurement system 78 and 80 may be visible and in communication with at least one of the networked laser tracking devices 46, 50, 52, 54, and 56. In such manner, the laser tracking devices 46, 50, 52, 54, and 56 may keep track of the position of each mobile measurement system 78 and 80 by reflecting laser beams off of one or more of the twelve targets attached to each mobile system 78 and 80 in order to determine the spatial X, Y, and Z location of each mobile system 78 and 80 as they travel around the aircraft 18 in their pre-determined patterns.

The mobile systems 78 and 80 may move to approximately seventy-five scanning/photographing locations around the periphery of the left and right sides of the aircraft 18. In each of the seventy-five locations, the scissor lifts having robotic arms, each holding two photogrammetry cameras and a pro-spot projector, may scan and photograph the left and rights sides of the aircraft 18 utilizing the process detailed in U.S. patent application Ser. No. 11/432,061, titled Laser And Photogrammetry Merged Process, filed on May 10, 2006, which is hereby incorporated by reference, in order to take measurements of the aircraft 18 using photogrammetry. The pro-spot projector on each mobile system 78 and 80 may provide an array of projected dots which are targets for the photogrammetry cameras. At each of the seventy-five locations, the robot may position the cameras and pro-spot projector in several different attitudes to provide substantial coverage of the aircraft's outer surface, in order to take photogrammetry pictures of the projected dot targets over a substantial portion of the aircraft. This may allow for measurement of surfaces of interest, such as high lifts, doors, and control surfaces. Spatial analyzer software may control the movement of the automated scissor lifts and the measurement sequences.

The camera images may be merged wirelessly and may be controlled utilizing GSI's V-Stars photogrammetry software. The digital data positions of the targets may be acquired by the laser trackers. This data may be sent to the V-Stars to assist with the transformation of the target location data which may be merged with the camera image/position data. In such manner, the photogrammetry data obtained at the seventy-five locations may be referenced with respect to the locations of the ten targets distributed over the aircraft. This combined data may then be sent to the Spatial Analyzer and V-Stars for final bundling in order to determine final airplane shape definition data. One or more computers may then determine the locations/positions/measurements of various portions of the aircraft in order to determine how the simulated flight-loads are affecting the aircraft. In such manner, the deflections of the aircraft, such as the deflections of the wings, may be determined during simulated flight.

After completing the measurement process, the central controller may lower the aircraft back on its landing gear. The measurement data may be processed by computers and compared to a reference, such as a CAD model or wind tunnel measurements. Based on the measured position data of the aircraft during the simulated flight, drag measurements may be determined. The measured aircraft may be compared with a computational fluid dynamic model of the theoretical perfect aircraft. The errors in shape of the measured aircraft may be determined in order to readjust and/or change the aircraft design and/or structure in order to reduce drag on the aircraft. The reduction of drag on the aircraft may save money in reduced fuel, may reduce wear, tear, and fatigue on the aircraft, and may reduce travel times.

In other embodiments, any number, type, size, location, and configuration of laser tracking devices, targets, mobile measurement systems, photogrammetry cameras, pro-spot projectors, automated guided vehicles, automated robots, software, and/or computers may be utilized to measure one or more portions of the aircraft while under simulated flight-loads.

In yet another embodiment of the invention, an aircraft may be provided. When the aircraft was not in flight, simulated flight-loads may have been applied to the aircraft to substantially simulate loads on the aircraft during flight. The aircraft may have been measured while under the simulated flight-loads. In another embodiment, the aircraft may have been readjusted to reduce drag based on data measured while under the simulated flight-loads.

It should be understood, of course, that the foregoing relates to exemplary embodiments of the invention and that modifications may be made without departing from the spirit and scope of the invention as set forth in the following claims.

We claim:

1. A method of measuring an aircraft under simulated flight-loads while not in flight comprising:
   placing at least one cradle device under each wing of the aircraft while the aircraft is disposed on a surface;
   placing at least another cradle device against each horizontal stabilizer of the aircraft;
   raising the aircraft off the surface by jacking up the at least one cradle device under each wing to apply upward forces against each wing;
   forcing the horizontal stabilizers in a downward direction by forcing the at least another cradle device downward against each horizontal stabilizer;
   applying simulated flight-loads to said aircraft by applying upward air pressure, supplied by the at least one cradle device, against each wing, and by applying downward air pressure, supplied by the at least another cradle device, against each horizontal stabilizer in order to substantially simulate loads on said aircraft during flight; and
   measuring a position of one or more portions of said aircraft while under said simulated flight-loads.

2. The method of claim 1 wherein said simulated flight-loads are determined by measuring actual flight-loads of a second aircraft during flight.

3. The method of claim 2 wherein said actual flight-loads are determined utilizing pressure sensing devices on said second aircraft during flight.

4. The method of claim 3 wherein said pressure sensing devices deliver data to one or more computers.

5. The method of claim 1 wherein said simulated flight-loads comprise loads determined by a computer model.

6. The method of claim 1 wherein the measuring utilizes at least one target, laser tracker, photogrammetry camera, and light-projector.

7. The method of claim 6 wherein said at least one target comprises a first portion adapted to reflect a laser beam towards said laser tracker and a second portion adapted to reflect a light beam towards said photogrammetry camera.

8. The method of claim 7 wherein a plurality of said targets are distributed on said aircraft.

9. The method of claim 7 wherein a plurality of said laser trackers are distributed around said aircraft.

10. The method of claim 7 further comprising at least one mobile measurement system.

11. The method of claim 10 wherein said at least one mobile measurement system comprises an automated guided vehicle, a robot, said photogrammetry camera, said light-projector, and said target.

12. The method of claim 11 wherein said at least one automated guided vehicle travels around said aircraft.

13. The method of claim 7 wherein deflections of wings of said aircraft, while said aircraft is under said simulated flight-loads, are measured utilizing multiple targets.

14. The method of claim 1 wherein the measuring utilizes one or more computers.

15. The method of claim 1 further comprising utilizing position data obtained during the measuring in order to readjust said aircraft to reduce drag.

16. The method of claim 1 wherein the applying further comprises at least one thin cushion air wall supporting the aircraft.

17. The method of claim 1 wherein the at least one cradle device and the at least another cradle device each comprise ribbed surfaces surrounding air chambers, and the applying comprises the air chambers supplying the upward and downward air pressure supporting the aircraft.

18. The method of claim 17 wherein the at least one cradle device and the at least another cradle device each comprise at least one sensor, and further comprising measuring with the at least one sensor the air pressure being supplied by the air chambers.

19. The method of claim 1 further comprising:
   determining expected flight-loads on said aircraft to approximate loads said aircraft experiences while in flight;

the applying comprises applying said expected flight-loads to said aircraft while said aircraft is not in flight in order to substantially simulate the loads on said aircraft during flight; and the measuring comprises measuring said aircraft while under said expected flight-loads.

\* \* \* \* \*